Nov. 6, 1951
RENÉ LUCIEN LEVY
ALSO KNOWN AS
RENÉ LUCIEN
AIRCRAFT RETRACTABLE LANDING SKID
2,574,404
Filed March 15, 1948
3 Sheets-Sheet 1
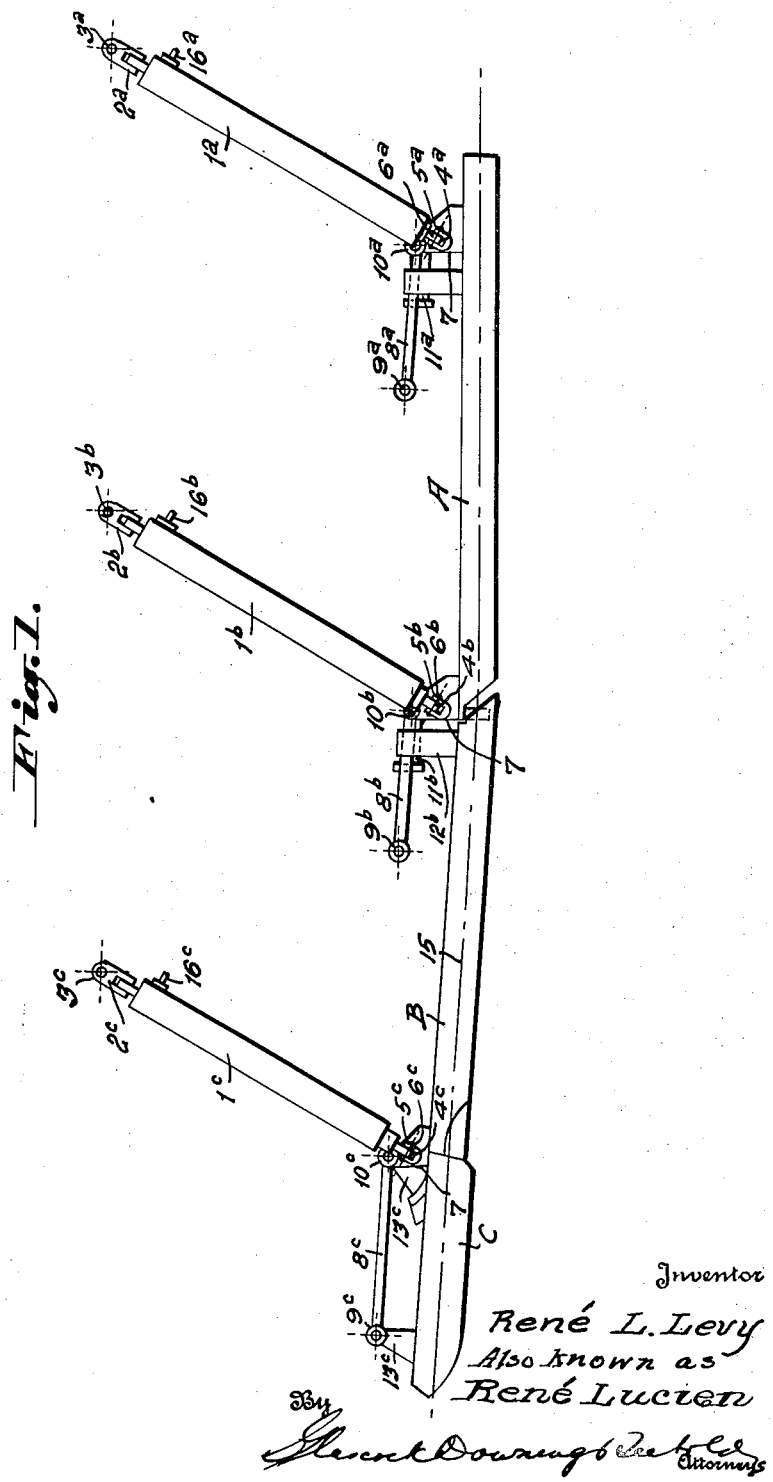

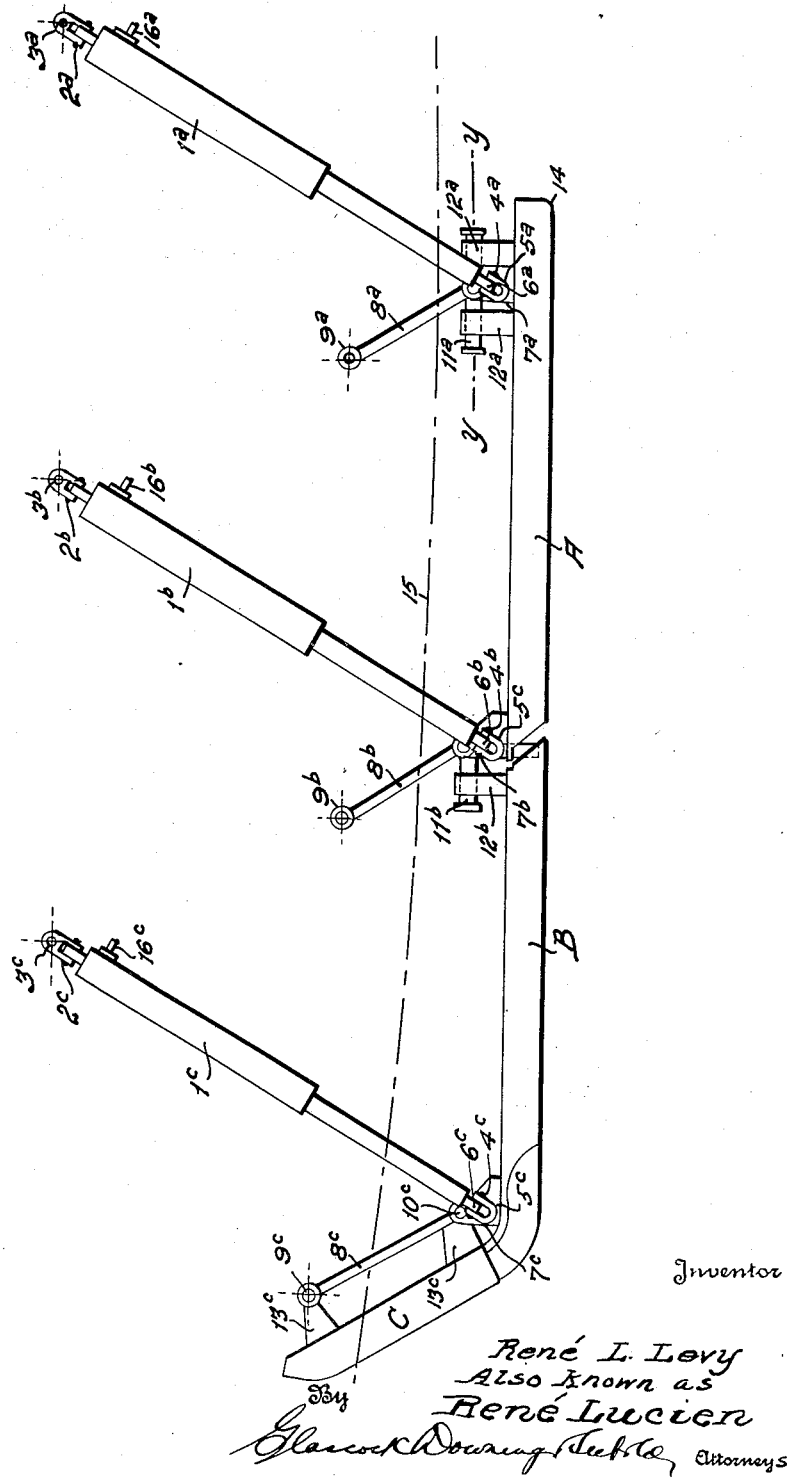

Nov. 6, 1951
RENÉ LUCIEN LEVY
ALSO KNOWN AS
RENÉ LUCIEN
AIRCRAFT RETRACTABLE LANDING SKID
2,574,404
Filed March 15, 1948
3 Sheets-Sheet 3
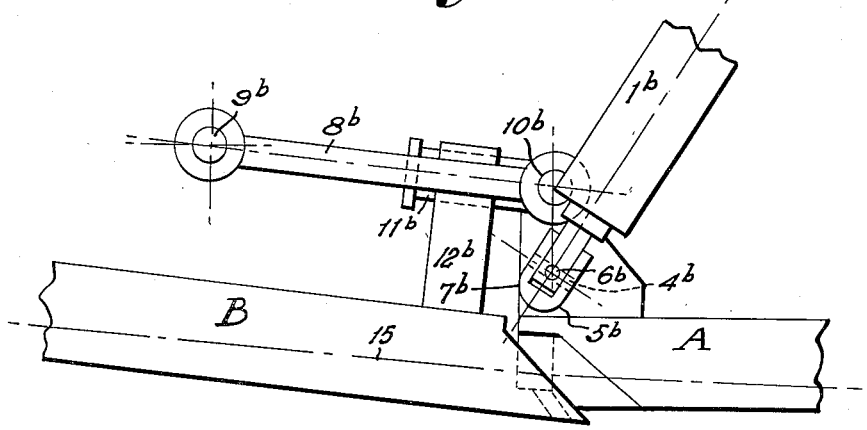
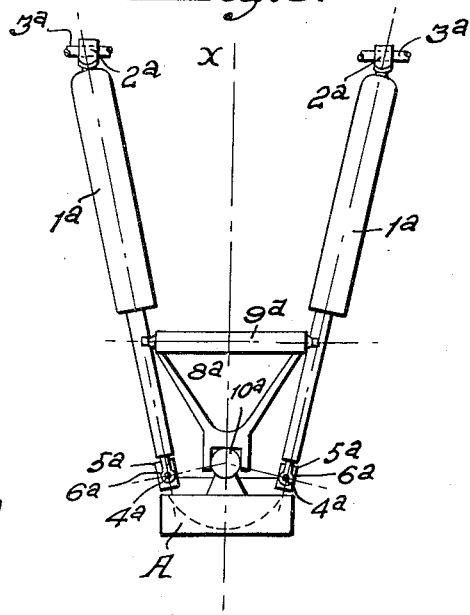
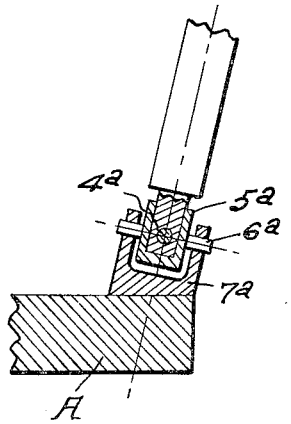
Inventor
René L. Levy
Also known as
René Lucien
By Glascock Downing Peeble
Attorneys Patented Nov. 6, 1951

2,574,404

UNITED STATES PATENT OFFICE 2,574,404

AIRCRAFT RETRACTABLE LANDING SKID

René Lucien Levy, also known as René Lucien, Paris, France, assignor to Societe D'Inventions Aeronautiques et Mecaniques S. I. A. M., Geneva, Switzerland, a corporation of Switzerland Application March 15, 1948, Serial No. 15,028
In France March 27, 1947

6 Claims. (Cl. 244—102)

It is known that high performance aircraft, in particular military aircraft, required to be of very reduced weight and to have very little drag. On the other hand, the use of thin wings to which these characteristics lead makes it more and more difficult to fit retractable undercarriages to such aircraft.

For these reasons it has been necessary to consider the use of aircraft of this category, in which the take-off is effected by catapulting, whereas landing is effected on a single skid located in the plane of symmetry of the machine.

The present invention has precisely for its object a skid which fulfils the essential condition which such an undercarriage should satisfy, and more especially for landing on a deck, in the case of a carrier-based aircraft.

This retractable skid is characterized by the combination of the following members:

(a) One or a plurality of landing plates, and a front nose or the equivalent thereof, which are hinged and which, during flight, are locked at the lower part of the fuselage of the aircraft.

(b) A system of jacks, which are preferably mounted in pairs and which are pivotally connected on the one hand to fixed points of the aircraft structure, and on the other hand to said plates.

(c) A system of V-shaped or equivalent members which are pivotally connected on the one hand to fixed points of the aircraft structure, and on the other hand to said plates in such a manner that when each of said plates is subjected to a drag it is in tensile stress relatively to the V which is located immediately in front of it.

(d) A connection of said V-shaped members to the plates by means of swivels, some of which are mounted on sliders which enable them to move relatively to said plates.

(e) A pivotal connection of the front part of the nose to the fixed point of pivotal connection of the corresponding V-shaped member.

Other peculiarities of the invention will become apparent from the following description of one of the embodiments thereof made with reference to the accompanying drawing in which:

Fig. 1 shows a side elevation of the system in the flying position.

Fig. 2 shows the same system in the landing position.

Fig. 3 shows one of the hinged groups supporting one of the plates, seen at 90° relatively to the previous figure.

Fig. 4 is a partial side elevational view on a larger scale.

Fig. 5 corresponds to Fig. 3, in respect of a detail.

The skid proper comprises a group of pivotally connected elements, which are three in number in the non-limitative example of the drawing, viz., from the rear towards the front, two plates A—B and a nose C. For small aircraft, the plates may be replaced by a single flexible plate made for example of ash. Said elements are separately controlled by pairs of jacks $1^a$—$1^b$—$1^c$ respectively, which are pivotally connected by means of jaws to a $1^a$—$1^b$—$1^c$ at fixed points $3^a$—$3^b$—$3^c$ on the aircraft structure. The jacks which are inclined with respect to the vertical (Figs. 1 and 2) are also inclined relatively to the medial plane $x$—$x$ of the aircraft (Fig. 3) and this latter feature makes it possible to choose for the fixed articulations $3^a$—$3^b$—$3^c$ positions which are located on the right and on the left side of the fuselage, thereby leaving the centre of same free.

Hereinafter the reference numerals of the various elements of the system will be given the indices $a$, $b$, $c$, according to the jack to which they refer.

The piston rods of the jacks, or reciprocally the jack cylinders themselves, are pivotally connected by means of pins 4 to jaws 5 which are adapted to pivot on pins 6 mounted on supports 7 secured to the skid.

The triangulation of the system is completed by three V-shaped parts 8 which are pivotally connected at 9 at their upper part to strong points of the aircraft structure. Their lower apex, said V-shaped members terminate by a swivel 10. The swivel $10^a$ belonging to the rear plate A is supported by a slider $11^a$ which is adapted to move in two bearings $12^a$—$12^a$ secured to said plate. Similarly, the intermediate plate B is supported by a slider $11^b$ which is adapted to move in bearings $11^b$ secured to said plate.

On the other hand, the nose C is connected to the member $8^c$ by means of lugs $13^c$, one of which is swivelled at $10^c$, the other of which is pivotally connected to the fixed point $9^c$.

It will be understood that the presence of the swivels contributes to hold the skid in the plane of symmetry of the aircraft without subjecting it to inadmissible stresses. It will also be understood that owing to this articulated assembly, each of the elements of the skid proper can move longitudinally with respect to the fuselage of the aircraft and can also swing about the swivels 10, thereby making it possible, when the aircraft is resting on the deck, to leave the aircraft isolated with respect to the skid and if desired to leave the aircraft resting on one end of a wing which would be provided for that purpose with a small auxiliary skid.

On the other hand, as shown in Fig. 3, the position of each swivel 10 is substantially raised relatively to the line which joins the articulations 4—4 of the corresponding jack rod and this arrangement produces a retracting moment which tends to retain the parallelism between the skid element and the ground for all degrees of penetration of said element towards the fuselage.

As essential features of the system consists in the fact that when each of the plates A and B subjected to a drag, it is in tensile stress relatively to the V which is immediately in front of it.

The operation of this system of skid will now be described.

During flight, the group of articulated elements is locked at the lower part of the fuselage (Fig. 1).

When landing on the deck the pilot, by extending the jacks, effects the extension of the skid into its landing position (Figs. 2 and 3).

The impact takes place on the rear heel 14 which is located slightly to the rear of the centre of gravity of the aircraft. At the instant when the impact occurs on heel 14, the swivel 10ª of the rear V moves slightly along the axis y—y owing to the slider 11ª, thereby enabling the heel to penetrate, by means of a relative movement, towards the fuselage and push in the jack 1ª, without the front part of the plate A itself being pushed in.

Then, as the aircraft swings forward, the whole of the plate A comes into contact with the ground, causing the jack 1ᵇ to be pushed in, and penetrating with a translatory movement parallel to the lower part of the fuselage, the lower contour of which is shown at 15.

This penetration is accompanied by a certain backward movement of the plate A relatively to the plate B, and this backward movement is made possible by the slider 11ᵇ.

As the operation of landing on the deck continues, the plate B in its turn comes into contact with the ground and causes the jack 1ᵇ to be pushed in by the combination of the vertical and horizontal forces to which said jack is subjected:

It should be noted that for using these skids on aircraft carriers it is necessary that there should be no projections which might be liable to engage as they pass the cables intended for securing the machine.

The following arrangements may, optionally and without exceeding the scope of the invention, complete the system of landing skid which has just been described.

1. Under the shock of the impact, the three jacks may act simply as hydraulic shock-absorbers without retracting devices. In this case at the end of the impact, the aircraft is resting on the skid which is completely crushed under the fuselage of the aircraft.

2. The rear jack 1ª 1ᵇ may be combined with the same liquid reservoir, their two pipes 16ª—16ᵇ opening into a common orifice for braking of the flow of the liquid. Under these conditions, when the impact occurs on the heel 14, this braking of the liquid is comparatively slight, since only the rear jack 1ª is involved and only until the instant when the jack 1ᵇ is pushed in in its turn. At this instant an increased quantity of liquid reaches the braking orifice since it is produced by the simultaneous retraction of both jacks. Braking is therefore, more violent after the swinging of the aircraft. Such an arrangement with a common orifice therefore, prevents on the one hand an excessive local stress opposite the fastenings of the jack 1ª, and on the other hand at the instant when the impact occurs prevents the sudden shock which would cause the aircraft to tip too quickly.

3. Jointly, the jack 1ᶜ may have an independent braking which, by means of a suitable adjustment, enables the landing operation to be carried out according to any desirable procedure.

4. A hydraulic control device of any suitable type may enable the skid to be extended alternately before landing, and said skid to be retracted.

5. A hydraulic device combined with the jacks or the like may make it possible, as soon as the landing of the aircraft has been effected, to cause same to be lifted by extending the skid to a sufficient extent to enable a manipulating trolley to be placed in position quickly and then allow the aircraft to rest on the trolley by retracting the jack and again retracting the skid.

I claim:

1. In an aircraft: a fuselage the bottom of which is longitudinally slotted along the vertical fore-and-aft plane of symmetry of the aircraft; a plurality of transversal parallel pivots fixed to the inner structure of said fuselage; hydraulic servo-motors universally mounted on said pivots at their upper end and a longitudinal landing skid or skate universally joined to the lower ends of said servo-motors and retractable substantially within said longitudinal slot by means of said servo-motors.

2. In an aircraft: a fuselage the bottom of which is longitudinally slotted along the vertical fore-and-aft plane of symmetry of the aircraft; a plurality of transversal parallel pivots fixed to the inner structure of said fuselage; hydraulic servo-motors universally mounted on said pivots at their upper ends and a longitudinal landing skid or skate universally joined to the lower ends of said servo-motors and retractable substantially within said longitudinal slot by means of said servo-motors, said landing skid or skate comprising a plurality of shoes and a leading point or beak articulated to the fuselage of the aircraft and locking means being provided to secure these shoes and beak substantiallly within the longitudinal slot of the fuselage during flight.

3. In an aircraft: a fuselage the bottom of which is longitudinally slotted along the vertical fore-and-aft plane of symmetry of the aircraft; a plurality of pairs of transversally aligned parallel pivots fixed to the inner structure of said fuselage on either side of said plane of symmetry; pairs of hydraulic jacks universally mounted on said pivots at their upper end and an articulated longitudinal landing skid or skate universally joined to the lower ends of said jacks and retractable substantially within said longitudinal slot by means of said jacks.

4. In an aircraft: a fuselage the bottom of which is longitudinally slotted along the fore-and-aft vertical plane of symmetry of the aircraft; a plurality of transversal horizontal shafts fixed on the inner structure of said fuselage; V-shaped members pivoted respectively at their two upper ends to said shafts and a longitudinal landing skid made of coextensive shoes and of a nose universally joined at their rear part to the respective lower apices of each of said V-members.

5. An aircraft according to claim 4 in which some of the universal joints between the apices of the V-members and the shoes of the skid are slidably mounted on longitudinally movable slides so as to be capable of longitudinal relative displacement with respect to said shoes.

6. An aircraft according to claim 4, in which the front part of the nose of the landing skid or skate is articulated on the horizontal shaft of the corresponding V-shaped member.

RENÉ LUCIEN LEVY,
*Also known as* RENÉ LUCIEN.

REFERENCES CITED

The following references are of record in the file of this patent:

FOREIGN PATENTS

| Number | Country | Date |
|---|---|---|
| 136,208 | Great Britain | Dec. 8, 1919 |
| 191,131 | Switzerland | Aug. 16, 1937 |
| 524,799 | France | May 20, 1921 |